(12) United States Patent
Chan et al.

(10) Patent No.: US 9,892,269 B2
(45) Date of Patent: Feb. 13, 2018

(54) TECHNIQUES FOR DATA MONITORING TO MITIGATE TRANSITIVE PROBLEM IN OBJECT-ORIENTED CONTEXTS

(71) Applicant: QUALCOMM Incorporated, San Diego, CA (US)

(72) Inventors: Michael J. T. Chan, San Diego, CA (US); Lu Xiao, San Diego, CA (US); Rosario Cammarota, San Diego, CA (US); Olivier Jean Benoit, San Diego, CA (US); Saurabh Sabnis, San Diego, CA (US); Yin Ling Liong, San Diego, CA (US); Manish Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/736,888

(22) Filed: Jun. 11, 2015

(65) Prior Publication Data
US 2016/0364573 A1 Dec. 15, 2016

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 21/6245* (2013.01); *G06F 2221/2101* (2013.01)

(58) Field of Classification Search
CPC . G06F 21/00; G06F 7/00; G06F 21/60; G06F 21/62; G06F 17/30; G06F 21/74;
(Continued)

(56) References Cited

U.S. PATENT DOCUMENTS 7,523,316 B2 * 4/2009 Cheng .................... G06F 21/32
713/182
7,752,215 B2 * 7/2010 Dettinger ............ G06F 17/3053
707/754

(Continued)

FOREIGN PATENT DOCUMENTS

WO 2014067428 A1 5/2014

OTHER PUBLICATIONS

International Search Report and Written Opinion—PCT/US2016/027237—ISA/EPO—dated Jul. 18, 2016—12 pgs.

(Continued)

*Primary Examiner* — Thanhnga B Truong
(74) *Attorney, Agent, or Firm* — Hunter Clark PLLC

(57) ABSTRACT

Techniques for mitigating the transitive data problem using a secure asset manager are provided. These techniques include generating a secure asset manager compliant application by tagging source code for the application with a data tag to indicate that a data element associated with the source code is a sensitive data element, accessing a policy file comprising transitive rules associated with the sensitive data element, and generating one or more object files for the application from the source code. These techniques also include storing a sensitive data element in a secure memory region managed by a secure asset manager, and managing the sensitive data element according to a policy associated with the sensitive data element by an application from which the sensitive data element originates, the policy defining transitive rules associated with the sensitive data element.

25 Claims, 11 Drawing Sheets

Lock-On of Data

(58) Field of Classification Search
CPC .......... G06F 21/34; G06F 21/72; G06F 21/53; G06F 2221/2105; G06F 21/604; G06F 21/6218; G06F 21/6245; H04L 9/32; H04L 29/06; H04K 1/00; H04W 12/06; G06Q 20/38; G06Q 20/34
USPC ..... 726/26–30, 1, 27; 707/754, 757; 705/51, 705/57; 713/166, 168–170, 174, 182, 713/189, 164, 165, 193
See application file for complete search history.

(56) References Cited

U.S. PATENT DOCUMENTS

| | | | |
|---|---|---|---|
| 8,181,260 B2 | 5/2012 | Friedman et al. | |
| 8,286,255 B2 | 10/2012 | Grant et al. | |
| 8,769,605 B2 | 7/2014 | Kaufmann et al. | |
| 9,177,174 B1* | 11/2015 | Shoemaker | H04L 63/08 |
| 9,300,665 B2* | 3/2016 | Ronda | H04L 9/3234 |
| 2002/0178271 A1* | 11/2002 | Graham | G06F 21/6245 709/229 |
| 2014/0281548 A1 | 9/2014 | Boyer et al. | |
| 2015/0020213 A1 | 1/2015 | Decouteau et al. | |
| 2015/0058997 A1 | 2/2015 | Lee et al. | |
| 2017/0134390 A1 | 5/2017 | Chan et al. | |

OTHER PUBLICATIONS

Second Written Opinion from International Application No. PCT/US2016/027237—European Patent Office—Rijswijk, The Netherlands—dated May 3, 2017—8 pgs.

International Preliminary Report on Patentability—PCT/US2016/027237, The International Bureau of WIPO—Geneva, Switzerland, dated Aug. 3, 2017.

\* cited by examiner

Build System

Build System

Target Device

Target Device

Lock-Down of Information

Secure Asset Manager

Lock-Down of Software

Lock-On of Data

Lock-On of Data – Example of Operational Rights

Lock-On of Data – Example of Derived Data Rights

TECHNIQUES FOR DATA MONITORING TO MITIGATE TRANSITIVE PROBLEM IN OBJECT-ORIENTED CONTEXTS

BACKGROUND

The use of application to access and process sensitive data presents challenges for application developers and owner/managers of such sensitive data to ensure that these applications are not leaking this sensitive data from one application to another. This problem has been referred to the transitive data problem.

In conventional computing devices, when an application A shares sensitive data D with an application B, the data D may be leaked by application B to application C or other applications. The data may also be modified before being leaked to the one or more other applications. Such interaction and transitivity issues can exist in Service Oriented Architectures (SOAs), such as the extensible ecosystems developed in JavaEE and .NET and the Android operating system, as well as other such environments in which data may be disseminated between applications in undesirable and unpredictable ways. Examples of situations where these issues may arise include: (1) organizations which utilize Bring Your Own Device plans in which employees can user their personal mobile device (phones, tablets, laptops, etc.) to access sensitive company information, (2) financial services where sensitive financial data could be passed from one application to another, (3) health monitoring services—where sensitive health-related data that may be protected under federal and/or state law (e.g. HIPAA) could be passed from one application to another. Reliable auditing of trust-critical events is an emerging requirement.

SUMMARY

Implementations of a method for protecting sensitive data according to the disclosure includes storing a sensitive data element in a secure memory region managed by a secure asset manager; and managing the sensitive data element according to a policy associated with the sensitive data element by an application from which the sensitive data element originates, the policy defining transitive rules associated with the sensitive data element.

Implementations of such a method can include one or more of the following features. The transitive rules comprise rules defining with which other applications the sensitive data element can be shared. Managing the sensitive data element further includes applying the policy from the application from which the sensitive data element originates to data elements derived from the sensitive data element. Managing the sensitive data element includes auditing each action performed on the sensitive data element and any data elements derived therefrom. Auditing each action performed on the sensitive data element and any data elements derived therefrom includes storing audit information in the secure memory region managed by the secure asset manager. Managing the sensitive data element includes providing one or more functions for performing operations on the sensitive data element. Managing the sensitive data element includes storing intermediate data values generated by the one or more functions in the secure memory region.

An example implementation of an apparatus according to the disclosure includes a memory and a processor. The processor is configured to store a sensitive data element in a secure memory region of the memory managed by a secure asset manager, and manage the sensitive data element according to a policy associated with the sensitive data element by an application from which the sensitive data element originates, the policy defining transitive rules associated with the sensitive data element.

Implementations of such an apparatus can include one or more of the following features. The transitive rules comprise rules defining with which other applications the sensitive data element can be shared. The processor configured to manage the sensitive data element is further configured to apply the policy from the application from which the sensitive data element originates to data elements derived from the sensitive data element. The processor configured to manage the sensitive data element is further configured to audit each action performed on the sensitive data element and any data elements derived therefrom. The processor configured to audit each action performed on the sensitive data element and any data elements derived therefrom is further configured to store audit information in the secure memory region managed by the secure asset manager. The processor configured to manage the sensitive data element is further configured to provide one or more functions for performing operations on the sensitive data element. The processor configured to manage the sensitive data element is further configured to store intermediate data values generated by the one or more functions in the secure memory region.

A method for generating a secure asset manager compliant application according to the disclosure includes tagging source code for the application with a data tag to indicate that a data element associated with the source code is a sensitive data element, accessing a policy file comprising transitive rules associated with the sensitive data element, and generating one or more object files for the application from the source code.

Implementations of such a method can include one or more of the following features. Signing the one or more object files with a security certificate indicating that the object file has been generated by a trusted provider. The data tag comprises a unique identifier that identifies which policy must be applied by a secure asset manager to the sensitive data element and any data elements derived therefrom at runtime of the application. Generating the one or more object files for the application includes compiling the source code with a secure asset manager compliant compiler that is configured to recognize the data tag and to generate a sensitive data object type for managing instances of the sensitive data element. Linking the object file with at least one other object file or library to create an executable file for a target device that implements a secure asset manager. The transitive rules associated with the sensitive data element identify a set of trusted applications that are allowed to access and perform one or more operations on the sensitive data element. The transitive rules associated with the sensitive data element identify which applications may derive data from the sensitive data element.

An example apparatus according to the disclosure includes a memory and a processor. The processor is configured to tag source code stored for the application stored in the memory with a data tag to indicate that a data element associated with the source code is a sensitive data element, to access a policy file comprising transitive rules associated with the sensitive data element, and generate one or more object files for the application from the source code in the memory.

Implementations of such an apparatus can include one or more of the following features. The processor is configured to sign the one or more object files with a security certificate indicating that the object file has been generated by a trusted provider. The data tag comprises a unique identifier that identifies which policy must be applied by a secure asset manager to the sensitive data element associated with the data tag at runtime of the application. The processor configured to generate the one or more object files for the application is further configured to compile the source code with a secure asset manager compliant compiler that is configured to recognize the data tag and to generate a sensitive data object type for managing instances of the sensitive data element. The processor is further configured to link the object file with at least one other object file or library to create an executable file for a target device that implements a secure asset manager. The transitive rules associated with the sensitive data element identify a set of trusted applications that are allowed to access and perform one or more operations on the sensitive data element. The transitive rules associated with the sensitive data element identify which applications may derive data from the sensitive data element.

DETAILED DESCRIPTION

Techniques for mitigating the transitive data problem are disclosed herein. Multiple-application environments can exhibit a transitivity problem in which data can be leaked from one application to another. The techniques disclosed herein solve this problem by controlling access to sensitive data through the use of policies that include rules indicating how sensitive data can be utilized and/or shared by applications, by applying the original policy rules associated with a particular instance of sensitive data to any data derived from the instance of sensitive data, by locking down the data in a secure area of memory to prevent unauthorized access to the data, and by generating an audit history for each sensitive data element that tracks each instance of the sensitive data element and each instance of data derived therefrom to provide a full history for the disposition of the sensitive data element.

The techniques disclosed herein can be used to track the history of sensitive data objects that are shared and access between applications via shared interfaces. Techniques are disclosed for preventing sensitive data from being leaked from one application to another in a multiple-application environment using a Secure Asset Manager (SAM). The techniques discussed herein can be used to tag sensitive data, to prevent unauthorized sharing of sensitive data between applications except where allowed by a policy defining the rules for dissemination of the sensitive data. The techniques disclosed herein can also be used to prevent the unauthorized sharing of data derived from the sensitive data. The policy associated with the original sensitive data element can be associated with any data derived from the sensitive data element so that the derived data is treated according to the policy rules associated with the original sensitive data element. The techniques disclosed herein can also include generating an audit log of trust-critical events on a device to track instances of sensitive data elements being accessed, shared, and/or modified by applications on a computing device. The techniques disclosed herein can be applied to a wide variety of contexts, including but not limited to Digital Rights Management (DRM), Trusted Execution environments, and/or other operating environments in which multiple applications may be implemented and the sharing of sensitive data between applications is desired.

The techniques disclosed herein can be divided into two logical stages. The first stage is referred to herein as the "lock-down of information" phase and the second stage is referred to herein as the "lock-on of information" stage. An example illustrating the lock-down of information phase is illustrated in FIG. 6, and an example illustrating the lock-on of information phase is illustrated in FIG. 7.

Figure 6:
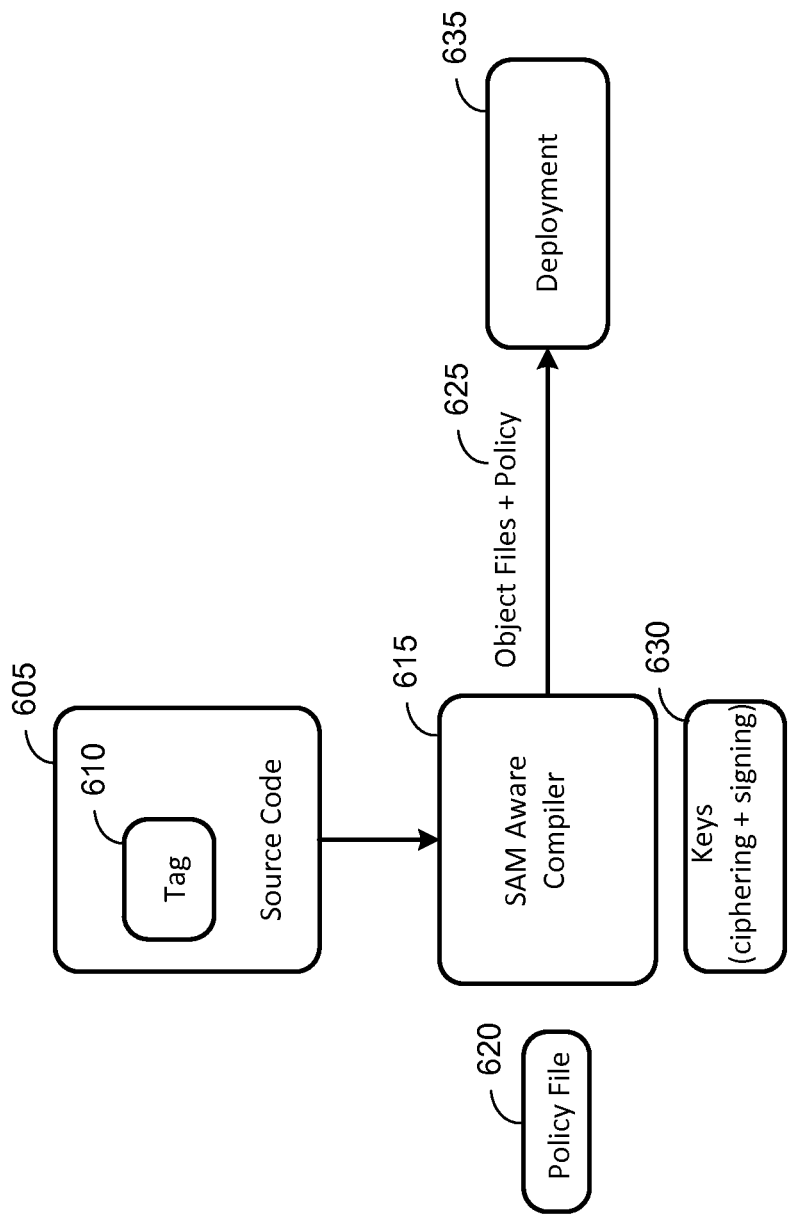
FIG. 6 is a logical block diagram of an example process for locking down sensitive data according to the techniques discussed herein.
Figure 7:
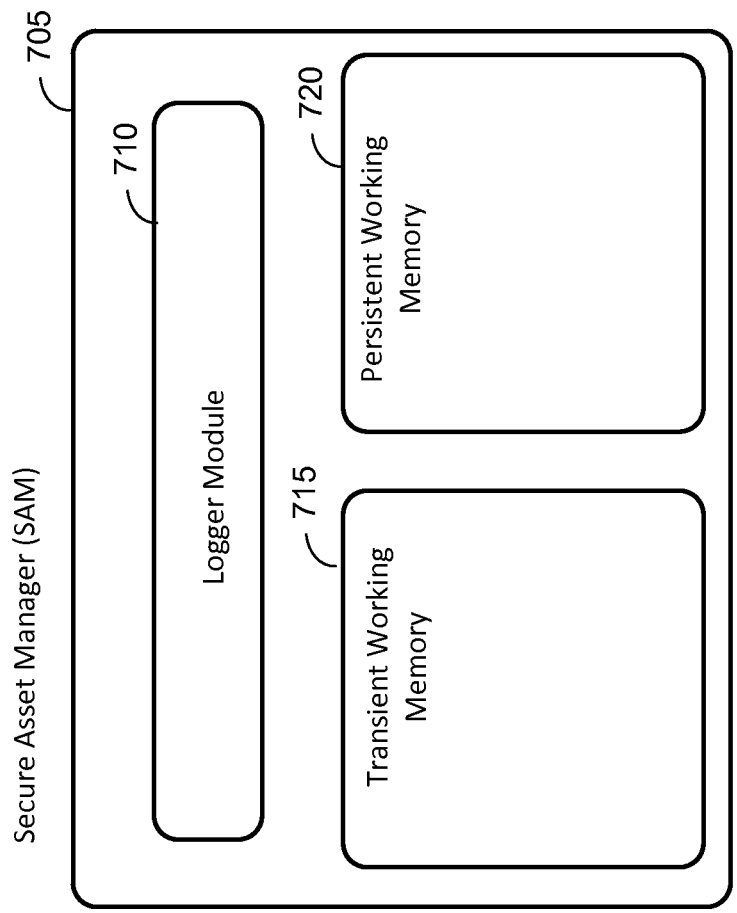
FIG. 7 is a logical block diagram of an example process for locking on sensitive data according to the techniques discussed herein.

FIG. 6 provides a high level logical block diagram illustrating a lock-down of information stage. During the lock-down phase, sensitive data elements associated with an application can be tagged in the source code to generate SAM-compliant applications in which the dissemination of sensitive data elements and data derived therefrom is managed by a Secure Asset Manager. The functionality of the SAM is discussed in greater detail with respect to FIG. 7.

The source code 605 for an application can include one or more references to sensitive data elements for which control of access and sharing of the sensitive data desired. An application developer can tag an instance of the sensitive data element with a tag 610 in the source code. The tag 610 marks the data element associated with the tag 610 as being sensitive data and the access and dissemination of the data stored in the sensitive data element is to be controlled by the policy 620 associated with the application. The tag 610 can be used to uniquely identify which policy information is associated with the sensitive data element and the particular transitive rules from the policy that are associated with the sensitive data element. When the SAM-aware compiler 615 generates the objects associated with the sensitive data element, this identifier is associated with the object. The SAM 705 is configured to keep track of all of the instances of the objects associated with this tag and to apply to the policy associated with that tag to these objects, even if these objects have been shared with a different application. The tag 610 does not convey the policy information itself, but instead serves as a pointer to the policy information that applies to a particular sensitive data element. Any data elements that are derived from a sensitive data element will inherit the information conveyed by the tag 610. The SAM 705 will continue to manage these data elements utilizing the same policy information associated with the original sensitive data element from which the new data elements were derived.

A SAM-aware compiler 615 can be used to compile the source code 605 that includes the tag 610. The SAM-aware compiler 615 can be configured to recognize tags identifying sensitive data elements included in the source code and to generate object code associated with the sensitive data elements to allow the SAM to control the access and dissemination of the sensitive data elements according to the policy information associated with the application.

The SAM-aware compiler 615 can be configured to generate an object class associated with the sensitive data element, such that instances of the sensitive data element generated by the application at runtime are instances of this object class or are an object class derived therefrom. The SAM-aware compiler 615 can be configured to output object files that include the object code for the application and the policy information 620 associated with the application. The policy information 620 can be in form of a file or files or can comprise entries in a database or other storage format for storing the policy information. The object files can be processed for deployment 635. During the deployment phase, the object code included in the object files can be linked and/or otherwise processed for a particular target device 175 on which the application is to be deployed. The SAM-aware compiler 615 can be configured to encrypt and/or sign the object files using a private encryption key associated with the application developer or content provider responsible for distributing the application.

The example illustrated in FIG. 6 includes a single tag 610 in the source code, but an application being built according to the techniques disclosed herein may use multiple tags representing multiple sensitive data elements in the source code. The SAM-compliant application built according to the process illustrated in FIG. 6 can implement SAM Application Programming Interfaces (APIs) that define an interface that allows the application to interact with the Secure Asset Manager 705 illustrated in FIG. 7 to store, access, and/or modify sensitive data elements.

The sensitive data element can comprise any information that an application developer deems to be information that should be disseminated without any oversight. For example, the sensitive information may comprise financial data, medical or health data, educational records, employment records, governmental data and/or other information the dissemination of which should be controlled. The dissemination of sensitive data elements can be controlled by the policy information 620 associated with the application. The policy information for a particular data element can include data tag information identifying the tag 610 used to tag the sensitive data element in the source code 605. The data tag can include a unique identifier that uniquely refers to each tagged data element from the source code.

The data tag can be implemented as an object type that can be used to identify sensitive data elements in the source code. Sensitive data elements can be defined as objects in the source code that inherit the properties of a SAM-compliant sensitive data object class. The source code can be tagged by adding a "sensitive" identifier to an object definition and the SAM-aware compiler 615 can be configured to process this tag to generate object files 625 that operate using the SAM-compliant techniques discussed herein. For example, a programmer could add a "sensitive" tag to a social security number object in source code to indicate that the social security number object is a sensitive data element whose use and dissemination should be controlled by the policy associated with the application. The SAM-aware compiler 615 can be configured to modify the social security number object type to inherit the properties of the SAM-compliant sensitive data element object type. The sensitive data element object type can include data elements for storing policy information associated with the sensitive data element and can implement methods for storing the sensitive data element with the SAM 705, for performing operations on the sensitive data element in the transient working memory 715 of the SAM 705, for accessing policy information associated with the application and the sensitive data element, for applying the policy information to control the usage and dissemination of the sensitive data elements, and/or other aspects of the techniques disclosed herein.

The sensitive identifier can also be configured to include parameters, such as a unique identifier for a particular data element. The unique identifier can be used to distinguish between multiple sensitive data elements of the same type in a particular application, and/or can be used to identify the policy information associated each sensitive data element included in the policy file. Different data elements can have different rules for their use and dissemination between applications defined for them in the policy file.

FIG. 7 provides a high level logical block diagram illustrating a lock-on of information stage. During the lock-on stage, an application that was built using the technique illustrated in FIG. 6 which is compliant with the Secure Asset Manager 705 can be executed on a target device 175. An application that is compliant with the Secure Asset Manager 705 can comprise an interface that allows the application to access and make use of sensitive data being managed by the SAM 705 according to the policy associated with the application. The sensitive data can be stored within a protected memory area utilized by the Secure Asset Manager 705 and is only accessible to applications permitted to access the data by the policy associated with the application that created the data. The policy associated with the application that originally generated a sensitive data element is also applied by the SAM 705 to any data elements derived from the sensitive data element. Furthermore, this policy follows the sensitive data element throughout the lifecycle of the sensitive data element, and is applied to copies of the data element stared with other application as well as to information derived from the original sensitive data element or copies thereof. Accordingly, the policy associated with the application that originally generated the sensitive data element is also applied by the SAM 705 to copies of the sensitive data elements shared with other SAM-compliant applications to prevent unauthorized dissemination of sensitive information.

The Secure Asset Manager 705 can be implemented as software that was included with the SAM-compliant application that was built using the process illustrated in FIG. 6 or can be implemented as software, firmware, or a combination thereof on the target device 175. The Secure Asset Manager 705 can be an application running in a secure memory space of the target device 175. For example, the processor 410 of the target device 175 can be configured to implement a secure processing environment which can include a dedicated portion of memory that is inaccessible to applications being executed outside of the secure processing environment. In other implementations, the Secure Asset Manager 705 can be configured to operate in a portion of memory that is not part of a secure processing environment. The Secure Asset Manager 705 can be configured to prevent access to the data by other processes. For example, the Secure Asset Manager 705 can be configured to encrypt or otherwise obfuscate the data contents of the transient working memory 715 and the persistent working memory 720 associated with the Secure Asset Manager 705. The SAM 705 can be configured to lock down all of the registers associated with the processor 410 of the target device 175 while the processor 410 of the target device 175 is processing data associated with the SAM 705 to ensure that protected data is not leaked from the secure memory space managed by the SAM 705. The SAM 705 can be configured to provide an interface that allows SAM-compliant applications to create and store sensitive data elements in the secure memory space managed by the SAM 705. The interface can also allow SAM-compliant applications to access, modify, or derive new secure date elements from sensitive data elements in the secure memory space managed by the SAM 705. The SAM 705 can be configured to track the application from which a particular sensitive data element originated. The SAM 705 can be configured to track the source information for data that is derived from a sensitive data element being maintained by the SAM 705. The SAM 705 can be configured to apply the policy information associated with the application that is the source of the sensitive data to determine which applications can access, modify, or create derivative information from a particular data element.

The SAM 705 can provide an interface that allows a SAM-compliant application to provide an instance of an object representing a sensitive data element generated by the SAM-compliant application to the SAM 705 for storage and management by the SAM 705. Alternatively, or in addition to this interface, the SAM 705 can provide an interface that allows the SAM-compliant application to request that the SAM 705 create a new instance of an object representing the sensitive data element for storage and management by the SAM 705. The SAM-compliant application can be configured to provide information required to generate the object to the SAM 705.

The transient working memory 715 can be used by the SAM 705 for operations being performed on sensitive data elements stored in the persistent working memory 720. The SAM 705 can be configured to clear the contents of the transient working memory 715 after an operation is completed on a sensitive data element. The persistent working memory 720 can be used to store information, such as the sensitive data elements deposited by one or more applications that are not currently being used as part of an operation, policy information associated with sensitive data elements, and other persistent information that that are not transient data elements generated as an operation is performed on a sensitive data element. In some implementations, the transient working memory 715 and the persistent working memory 720 can be implemented in a single memory space, and the SAM 705 can be configured to manage the memory allocation and cleanup of transient data and persistent data items. The SAM 705 can be configured to clean up persistent data, such as policy information and/or sensitive data elements, from the persistent working memory 720 responsive to a SAM-compliant application on the target device 175 being shut down and/or responsive to an instruction from the SAM-compliant application that the sensitive data is not currently needed. A SAM-compliant application can be configured to signal the SAM 705 that the SAM-compliant application no longer requires a particular set of data being maintained by the SAM 705 and the SAM 705 can be configured to clean up any sensitive data elements associated with the application stored in the transient working memory 715 and the persistent working memory 720. Furthermore, the SAM 705 can be configured to continue to apply the policy associated with the application to any sensitive data elements that were shared with other applications, even if the application that originally shared the data is no longer actively running on the device and utilizing sensitive data elements stored by the SAM 705.

The SAM 705 can also be configured to store policy information in the persistent working memory 720. The policy information associated with a particular application can be updated periodically. For example, the policy information for a particular application may be updated to add or remove identifiers of one or more other applications which the application may share sensitive data elements. The SAM 705 can be configured to request updated policy information from a trusted entity and/or to receive updated policy information pushed to the target device 175 by the trusted entity.

Figure 1:
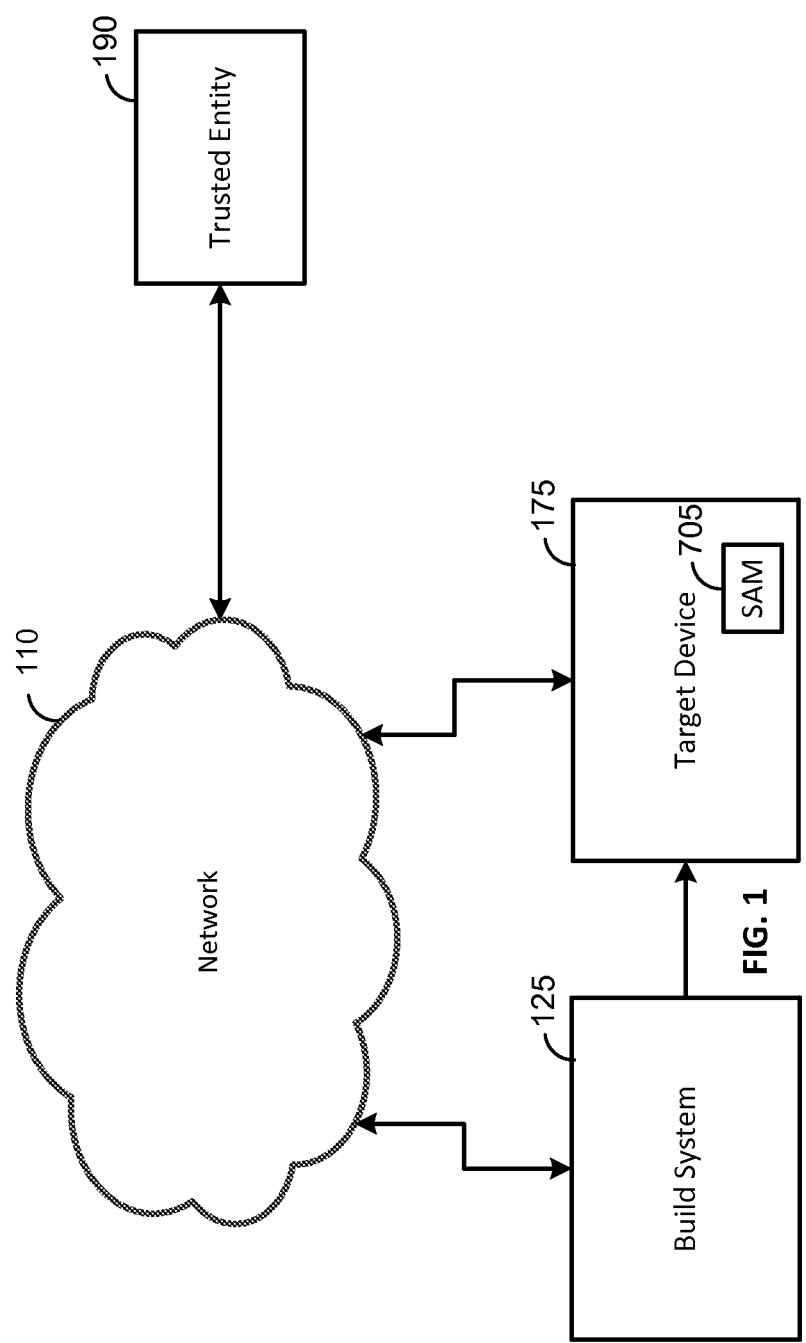
FIG. 1 is a block diagram of an example network architecture or computing environment, which may be suitable for an implementing the techniques discussed herein.

The logger module 710 can be configured to generate an entry in an audit log for any operations performed on a sensitive data element. The logger module 710 can be configured to store the audit logs in the persistent working memory 720. The logger module 710 can be configured to log which applications request a particular instance of sensitive data maintained by the SAM 705, the actions that were performed on the sensitive data maintained by the SAM 705, and other information that can be used to track the usage and dissemination of sensitive data. The logger module 710 can also be configured to log the creation of data elements derived from sensitive data elements maintained by the Example Network/Computing Environment FIG. 1 is a block diagram of an example computing environment, which may be suitable for an implementing the techniques discussed herein. The particular configuration illustrated herein is merely an example of one computing environment in which the techniques disclosed herein may be used. Furthermore, an implementation of such a computing environment may include additional elements that are not illustrated herein and have been omitted for the sake of clarity.

Figure 2:
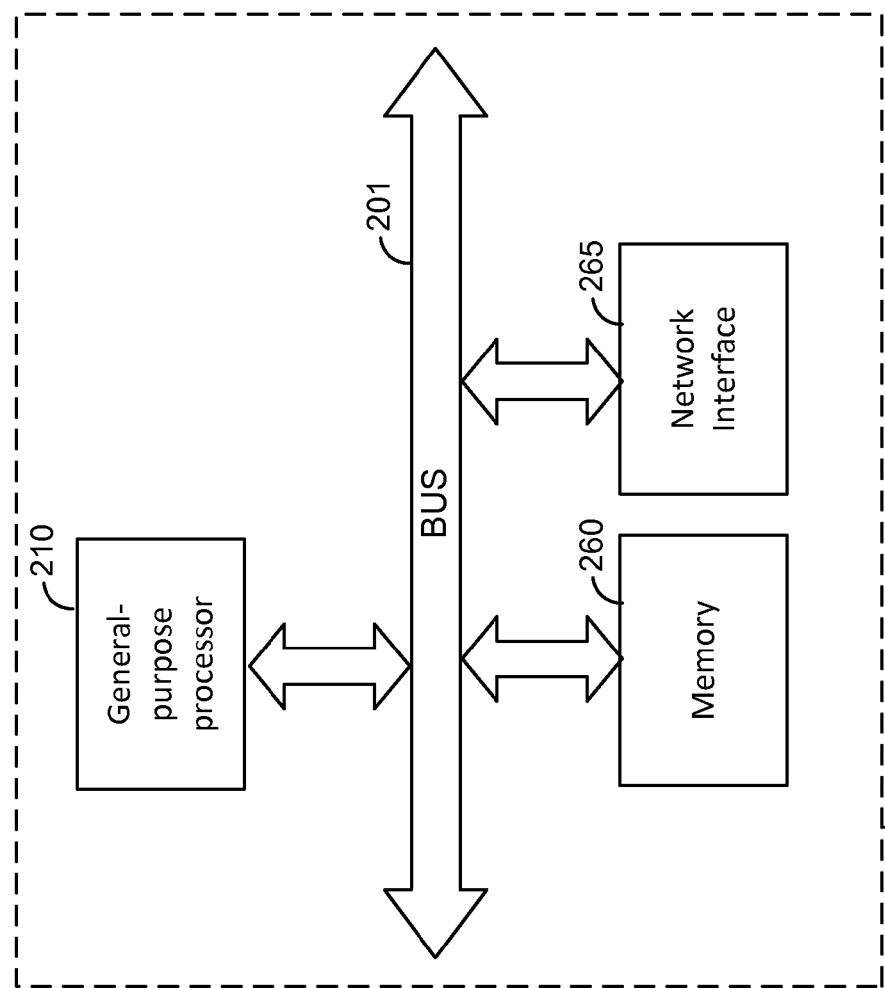
FIG. 2 is a block diagram of a computing device that can be used to implement the build system illustrated in FIG. 1.
Figure 3:
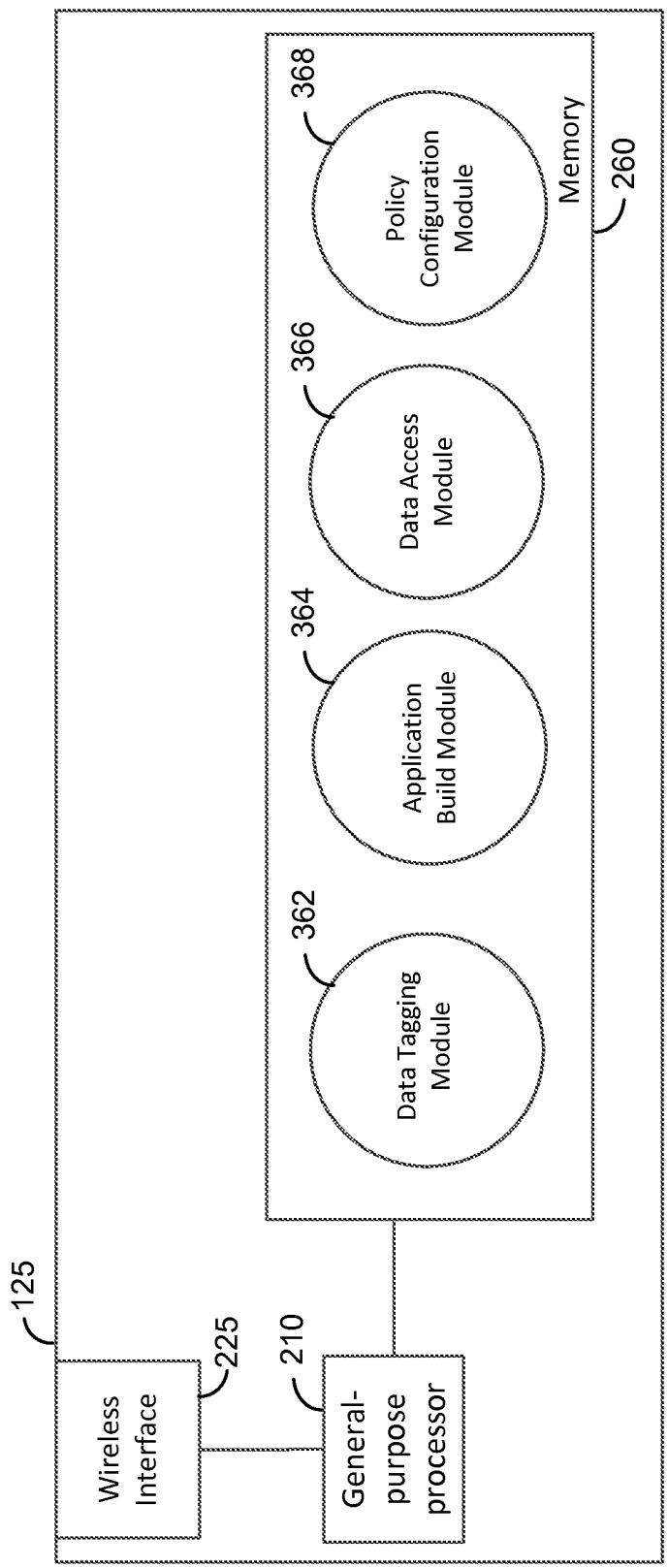
FIG. 3 is a functional block diagram of the build system illustrated in FIGS. 1-2 that illustrates functional modules of the build system shown in FIGS. 1-2.

The build system 125 can be configured to provide means for building secure asset manager (SAM) compliant applications that can be deployed on one or more target devices 175. The build system 125 can be configured to provide means for implementing the processes illustrated at least in FIGS. 6 and 8, which can be implemented in software, hardware, or a combination thereof by the build system 125. Examples of a computing device that can be used to implement the build system 125 are illustrated in FIGS. 2 and 3, which are discussed in detail below. The example computing environment illustrated in FIG. 1 illustrates one possible configuration of a computing environment in which the techniques disclosed herein can be implemented and is not intended to be limiting. Other configurations are possible. For example, the build system 125 and/or the processes illustrated in FIGS. 6 and 8 can be performed on more than one computing device, the trusted entity 190 may not be included in some implementations, and/or the network 110 may not be utilized to provide software content to the build system 125 and the target device 175.

While the examples discussed herein utilize a single build system 125 to generate the application or applications that are to be utilized on the target device 175, the target device 175 can be configured to receive SAM-compliant applications from multiple build systems 125. Furthermore, the target device 175 and the build system 125 may be connected to one another either directly or indirectly via a wired or wireless connection, and there may be one or more intervening systems or networks, such as network 110, between the build system 125 and the target device 175. For example, the applications generated by the build system 125 may be made available for download from the trusted entity 190 and/or a separate content server (not shown) that may be logically disposed between the build system 125 and the target device 175. For example, an application developer may make one or more SAM-compliant applications that are compatible with the target device 175 available for download from the trusted entity 190 or another content server, and a manufacturer or distributor of the target device 175 may download one or more applications associated with the operating system to the target device 175 from the trusted entity 190 or the other content server.

The build system 125 may be operated by a manufacturer of the target device 175, a network service provider of the target device 175, a reseller of the target device 175, an application content provider of applications that can be used on the target device 175, an audiovisual content provider, and/or by an operating system provider that provides operating systems that can be utilized on the target device 175. A manufacturer or reseller of the target device 175 may include one or more applications that can be used by the target device 175 and which may have access sensitive data the sharing of which should be limited based on a policy defined for the application.

The target device 175 is a computer system that is configured to execute software content stored in a persistent memory of the target device 175. The target device 175 can be configured to receive one or more applications from the build system 125 and/or from multiple build systems 125. The target device 175 can comprise a mobile device, such as a mobile phone, a tablet computer, a laptop computer, a portable gaming device, a wearable computing device, or other such device that includes a processor for executing software content. The target device 175 can also comprise a non-mobile device, such as a desktop computer system, a computer server, a set-top box, digital video recorder (DVR), a game console, or other such device that is not as readily movable as a mobile device. The target system 175 can provide means for implementing the process illustrated at least in FIGS. 7 and 9, which may be implemented in software, hardware, or a combination thereof by the target system 175.

The trusted entity 190 is an optional entity that may be utilized as a repository for policy information related to one or more SAM-compliant applications. The trusted entity 190 can be configured to receive the policy information for an application from the build system 125. The trusted entity 190 can provide a user interface that allows application developers to modify the policy information for a particular application. The trusted entity 190 can be configured to receive requests for policy information from a target device 175 and to send the information to the target device over the network 110. The trusted entity 190 can also be configured to push updated policy information to target devices 175 that utilize one or more SAM-compliant applications. The trusted entity 190 can also be configured to provide downloads of SAM-compliant applications that can be used on a target device 175. For example, the trusted entity 190 can be configured to operate as a content server that implements an application store or library from which application content can be downloaded for the target device 175.

The example network configuration or computing environment illustrated in FIG. 1 is merely an example of one possible configuration in which the techniques disclosed herein may be implemented. Other configurations may include additional elements not illustrated in FIG. 1 and the various components may be interconnected in a different configuration than what is shown in FIG. 1.

Example Hardware

FIG. 2 is a block diagram of a computing system that can be used to implement the build system 125 illustrated in FIG. 1. The build system 125 can be used to implement, at least in part, the processes illustrated in FIG. 7.

The build system 125 comprises a computer system including a general-purpose processor 210, a non-transitory memory 260, and a network interface 265 connected to each other by a bus 201. Other implementations of the build system 125 may include additional elements not illustrated in the example implementation of FIG. 2 and/or may not include all of the elements illustrated in the example embodiment illustrated in FIG. 2.

The processor 210 can be an intelligent device, e.g., a personal computer central processing unit (CPU), a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

Network interface 265 can provide a means for providing wired and/or wireless connectivity to one or more networks, such as the network 110. The network interface 265 can allow the build system 125 to communicate with the target device 175, the trusted entity 190, and/or other entities connected to a network, such as a content provider or trusted entity 190 configured to distribute executable program content, such as application or operating system content, and/or policy information to a target device 175.

The software in the memory 260 is configured to enable the processor 210 to perform various actions, including providing a user interface for configuring a policy for an application, for providing a user interface for adding data tags to source code for the application, for building the application, and for deploying the application to a target device 175 or to a content server. The software in the memory 260 of the can also be configured to provide copies of a SAM-compliant application or applications to the trusted entity 190 and/or a separate content server where a separate content server is used to distribute the applications to target devices 175. The functions performed by some or all of the software in the memory 260 of the build system 125 can be implemented as digital or analog hardware components of the build system 125 and/or a combination of hardware and software.

FIG. 3 is a functional block diagram of the build system 125 illustrated in FIG. 2 that illustrates functional modules of the memory 260 shown in FIG. 2. For example, the build system 125 can include a data tagging module 362, an application build module 364, a data access module 366, and a policy configuration module 368. The build system 125 may also include one or more additional functional modules that provide other functionality to the build system 125. The functional modules illustrated in FIG. 3 may be implemented as software executed by processor 210 as illustrated in FIG. 3 or may be implemented in hardware or a combination of hardware and software executed by the processor 210. The build system 125 illustrated in FIGS. 2 and 3 can be used to implement the build system 125 associated with the processes illustrated in FIG. 7. The processor 210 can also provide means for implementing the various modules of the build system 125 discussed herein and may operate in conjunction with one or more modules implemented in firmware. The build system 125 can include digital and/or analog circuitry that implements some or all of the modules discussed herein.

The data tagging module 362 can provide means for tagging sensitive data elements in software code. The data tagging module 362 can provide means for presenting a user interface for software code for an application to a user of the build system 125 to allow the user to identify data elements within the software that are sensitive data elements and for generating the policy rules associated with that that particular data element to be included in the policy file for the application. The policy file can indicate which applications can access the sensitive data element, whether an application can share the sensitive data with other applications, and which applications with which the application may share the sensitive data. The data tagging module 362 can provide means for making images for multiple types of target devices. As discussed above with respect to FIG. 6, the data tagging module 362 can be configured to add an identifier to the source code that the SAM-aware compiler 615 can use to identify a sensitive data element.

The application build module 364 can provide means for building an application that includes one or more sensitive data elements that have each been associated with a data tag, means for providing the application to one or more target devices 175, means for uploading the application and/or policy information associated with the application to a trusted entity 190 for distribution to the target device 175. The application build module 364 can be configured to compile source code that has been tagged by the data tagging module 462 and can associate object types with the sensitive data elements that have been tagged in the source code. The application generated from the tagged source code can be configured to generate an instance of a sensitive data element object that can be used to store the sensitive data element and to request that the SAM 705 store the sensitive data object. Alternatively, the application can be configured to request that the SAM 705 generate a new instance of a sensitive data elements and to store the sensitive data element in a memory area associated with the SAM 705, such as the persistent working memory 720. In some implementations, the application build module 364 can be configured to generate a sensitive data element object for each sensitive data element that has been tagged in the source code where the object is configured to include logic to request that the SAM 705 store the sensitive data element in the protected memory region managed by the SAM 705. The sensitive data object in such implementations would incorporate much of the logic required to ensure that the data stored in the sensitive data element object remains secure out of the hands of the programmer writing the software code, and the sensitive data object could be treated similarly to any other object utilized by the application.

The data access module 366 can be configured to store data in the memory 260 and/or other data storage devices associated with the build system 125. The data access module 366 can also be configured to access data in the memory 260 and/or other data storage devices associated with the build system 125. The data access module 366 can be configured to receive requests from other modules and/or components of the build system 125 and to store and/or access data stored in the memory 260 and/or other data storage devices associated with the build system 125.

The policy configuration module 368 can provide a user interface that enables an application developer to create a policy file or policy files to be associated with an application. A policy file includes policy information associated with sensitive data elements for the application. The policy configuration module 368 can also be configured to allow policy files to be modified. For example, the source code associated with an application may be updated to include additional data tags associated with sensitive data elements. The policy configuration module 368 can be configured to provide the policy file to the trusted entity 190, and the trusted entity 190 can be configured to distribute the policy information to the target device 175. The user interface provided by the policy configuration module 368 can be configured to allow the rules for sharing individual data elements associated with an application or the rules for sharing all of the sensitive data elements associated with the application to be updated. An application developer or distributor may wish to update with which applications a particular application may share data and which sensitive data elements that the application may share with the other applications. The policy configuration module 368 can be configured to allow the policy information to be updated once the application has already been deployed to one or more target devices 175. The policy configuration module 368 can be configured to send the updates from the build system 125 to the one or more target devices through the network 110 or to the trusted entity 190. The target devices 175 can be configure to periodically request the updated policy information from the trusted entity 190. The trusted entity 190 can also be configured to push the updated policy information to the target device 175.

The policy information can define one or more transitive rules associated with the sensitive data element that define how the sensitive data element can be shared with and/or utilized by other applications. The policy information can include transitive rules that define how many levels of from the originating application a sensitive data element can be propagated. The term "level" used as used herein refers to how many instances along a chain of instances of a sensitive data element can be created before a limit imposed by the policy is reached. The policy can impose different types of limits on different types of operations that may be performed on a sensitive data element. The transitive rules included in the policy information can provide a high level of control over what and how a designated entity can do with a sensitive data element at each level. The transitive rules can dictate which operations a particular entity may perform on a particular sensitive data element. The rules can also dictate what and how an entity a particular level from the origination application can do with the sensitive data element. The originating entity can also revoke privileges for specific entities or for entities at a particular level removed from the originating entity by issuing an update to the policy information for the originating application. The policy information allows the originator of a sensitive element fine grained control over that sensitive data element. The transitive rules include in the policy information can be viewed and/or modified using the policy configuration module 368.

Figure 4:
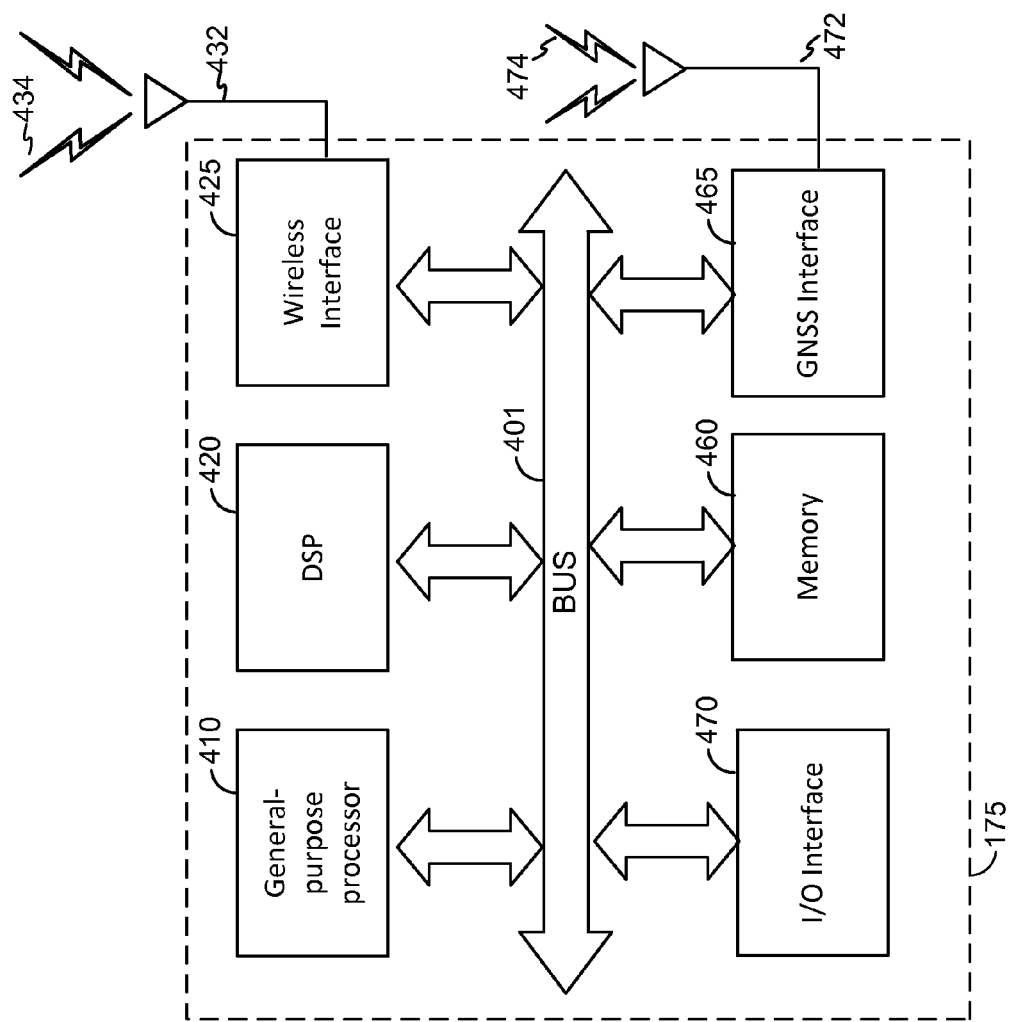
FIG. 4 is a block diagram of a computing device that can be used to implement the target device illustrated in FIG. 1.

FIG. 4 is a block diagram of a computing system that can be used to implement the target device 175 illustrated in FIG. 1. The target device can be used to implement, at least in part, the processes illustrated in FIG. 8.

The target device 175 comprises a computer system including a processor 410, a digital signal processor (DSP) 420, a wireless interface 425, a GNSS interface 465, and a non-transitory memory 460, connected to each other by a bus 401. Other implementations of the target device 175 may include additional elements not illustrated in the example implementation of FIG. 4 and/or may not include all of the elements illustrated in the example embodiment illustrated in FIG. 4. For example, some implementations of the target device 175 may not include the GNSS interface 465, the DSP 420, and/or the wireless interface 425.

The wireless interface 425 can include a wireless receiver, transmitter, transceiver, and/or other elements that enable the target device 175 to send and/or receive data using WWAN, WLAN, and/or other wireless communication protocols. The wireless interface 425 can comprise one or more multi-mode modems capable of transmitting and receiving wireless signals using multiple wireless communications standards. The wireless interface 425 is connected by a line 432 to an antenna 434 for sending and receiving communications to/from wireless devices configured to communicate using wireless communication protocols. While the target device 175 illustrated in FIG. 4 comprises a single wireless interface 425 and a single antenna 434, other implementations of the target device 175 can include multiple wireless interfaces 425 and/or multiple antennas 434. Furthermore, the target device 175 can include a wired interface instead of or in addition to the wireless interface for providing a wired connection to one or more networks.

I/O interface 470 can provide one or more ports and/or other interfaces that can provide for data inputs and/or outputs to the target device 175. For example, the I/O interface 470 can include one or more ports, such as a Universal Serial Bus (USB) port and/or other type of port that can be used to connect external devices to the mobile device. The I/O interface 470 can also include one or more input devices, such as buttons, switches, a keypad, a touchscreen and/or other means for receiving input from a user. The I/O interface 470 can also include one or more means for outputting audio and/or visual content, such as a screen, a speaker, a headphone port and/or other means for outputting such content.

The GNSS interface 465 can include a wireless receiver and/or other elements that enable the target device 175 to receive signals from transmitters associated with one or more GNSS systems. The GNSS interface 465 is connected by a line 472 to an antenna 474 for receiving signals from the GNSS transmitters. The target device 175 can be configured to use signals received from satellites associated with satellites and other transmitters associated with the GNSS systems to determine a position of the target device 175. The target device 175 can also be configured to use the signals received from the satellites and other transmitters associated with the GNSS systems in conjunction with signals received from other wireless devices.

The DSP 420 can be configured to process signals received from the wireless interface 425 and/or the GNSS interface 465 and may be configured to process signals for or in conjunction with one or more modules implemented as processor-readable, processor-executable software code stored in memory 460 and/or can be configured process signals in conjunction with the processor 410.

The processor 410 can be an intelligent device, e.g., a personal computer central processing unit (CPU), a microcontroller, an application specific integrated circuit (ASIC), etc. The memory 460 is a non-transitory storage device that can include random access memory (RAM), read-only memory (ROM), or a combination thereof. The memory 460 can store processor-readable, processor-executable software code containing instructions for controlling the processor 410 to perform functions described herein (although the description may read that the software performs the function(s)). The software can be loaded onto the memory 460 by being downloaded via a network connection, uploaded from an external memory device, etc. Further, the software may not be directly executable, e.g., requiring compiling before execution.

The software in the memory 460 is configured to enable the processor 410 to perform various actions, including implementing sending and/or receiving data from devices configured for wireless communication. The functions performed by some or all of the software in the memory 460 of the target device 175 can be implemented as digital or analog hardware components of the target device 175 and/or a combination of hardware and software.

Figure 5:
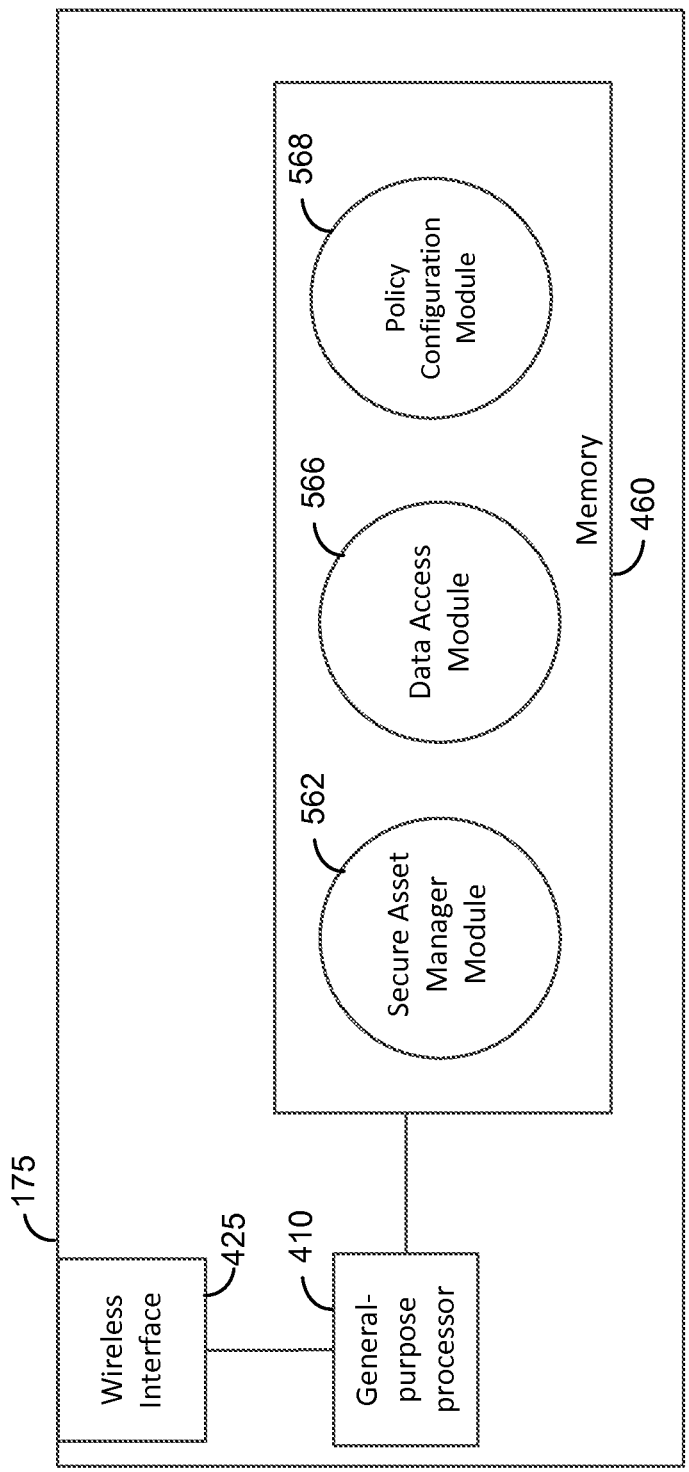
FIG. 5 is a functional block diagram of the target device illustrated in FIGS. 1 and 4 that illustrates the functional modules of the target device shown in FIGS. 1 and 4.

FIG. 5 is a functional block diagram of the target device 175 illustrated in FIG. 4 that illustrates functional modules of the memory 460 shown in FIG. 4. For example, the target device 175 can include a secure asset manager module 562, a data access module 566, and a policy configuration module 568. The target device 175 may also include one or more additional functional modules that provide other functionality to the target device 175. The functional modules illustrated in FIG. 5 may be implemented as processor executable software as illustrated in FIG. 5 or may be implemented in hardware or a combination of hardware and software. The target device 175 illustrated in FIGS. 4 and 5 can be used to implement the target device 175 associated with the process illustrated in FIGS. 7 and 9. The processor 410 can also provide means for implementing the various modules of the target device 175 which can comprise processor-executable software and may operate in conjunction with one or more modules implemented in firmware. The target device 175 can include digital and/or analog circuitry that implements some of or all of the modules of the target device 175.

The secure asset manager module 562 can provide means for implementing a Secure Asset Manager (SAM) 705 on the target device 175. The secure asset manager module 562 can provide means for implementing the logger module 710 illustrated in FIG. 7 and used in the process illustrated in FIG. 9. The secure asset manager module 562 can also provide means for managing the contents of the transient working memory 715 and the persistent working memory 720 of the SAM 705. The secure asset manager module 562 can be configured to utilize a portion of the memory 460 to implement the transient working memory 715 and the persistent working memory 720 and/or other memory of the target device 175. The secure asset manager module 562 can be configured to make use of a secure processing environment provided by the processor 410 if the processor 410 is capable of providing such a secure processing environment. The secure asset manager module 562 can be configured protect the contents of the transient working memory 715 and the persistent working memory 720 by preventing other applications and/or processes running on the target device 175 from accessing the memory space allocated to the transient working memory 715 and the persistent working memory 720. The secure asset manager module 562 can also be configured obfuscate, encrypt, or otherwise protect the contents of the transient working memory 715 and the persistent working memory 720.

The secure asset manager module 562 provide means for managing the access to sensitive data stored in the transient working memory 715 and the persistent working memory 720 of the SAM 705. The secure asset manager module 562 can be configured to access policy information stored in the persistent working memory 720 and to apply the policy information to instances of sensitive data that was tagged by the data tagging module 362 of the build system 125 and is not stored in the transient working memory 715 and/or the persistent working memory 720 of the SAM 705. The secure asset manager module 562 can be configured to provide means for performing the various actions associated with the processes illustrated in FIGS. 7 and 9 unless otherwise specified.

The data access module 566 can be configured to store data in the memory 460 and/or other data storage devices associated with the target device 175. The data access module 566 can also be configured to access data in the memory 460 and/or other data storage devices associated with the target device 175. The data access module 566 can be configured to receive requests from other modules and/or components of the target device 175 and to store and/or access data stored in the memory 460 and/or other data storage devices associated with the target device 175.

The policy configuration module 568 can provide user interface that can allow a user of the target device 175 to modify the policy information associated with one or more SAM-compliant applications on the target device 175. The policy configuration module 568 can be configured to allow the user of the target device 175 to customize how the sensitive information for that user is shared between applications and to control which information can be shared. The user of the target device 175 can exercise the same or similar fine grained control over sensitive data elements by viewing, modifying, or creating transitive rules included in the policy information for a particular application. The policy configuration module 568 can allow the user of the target device 175 implement sharing policies that are more or less strict than the policies that have been provided with the applications on the target device 175. For example, a user of the target device may configure the policy associated with a first application to prevent the sharing of any information with a second application, even though the policy information provided by the application developer or distributor permitted the sharing of sensitive data between the first and second applications. A user of the target device 175 may also permit the sharing of data between two SAM-compliant applications that were not originally included in the policy files associated with those applications. For example, the user of the target device 175 may configured the policy associated with a first application to allow the sharing of any information with a third application, even though the policy information provided by the application developer or distributor did not permit the sharing of sensitive data between the first and third applications. The policy configuration module 568 can be configured to identify which SAM-compliant applications are installed on the target device 175 and the sensitive data elements associated with each of the SAM-compliant applications for which the user can configure the rules for sharing this information between applications. For example, the user may allow for the sharing one sensitive data element, such as a the user's name, between a first application and a second application, but may prevent the first application from sharing other information, such as the user's social security number or income information with the second application.

The policy configuration module 568 can also be configured to prevent a user of the target device 175 from overriding the policy information associated with an application. An application publisher or distributor can indicate that the policy information associated with a particular application cannot be overridden by a user of the target device 175. An application publisher or distributor can also indicate that the policy rules associated with specific data elements cannot be overridden by a user of the target device 175. For example, an developer or publisher of an application that utilizes digital rights managed (DRM) protected content could mark authentication information associated with the user and/or the target device 175 as information that cannot be shared between applications, and the user of the target device 175 cannot override these policy rules order to obtain the authentication information and potentially circumvent the DRM protections on the protected content. The developer or publisher of the application may also mark the unencrypted or unprotected content as information that cannot be shared between applications, to prevent the DRM protections on the content from being circumvented by providing the unprotected content to another application which could store the content without the DRM protections.

Example Implementations

Figure 8:
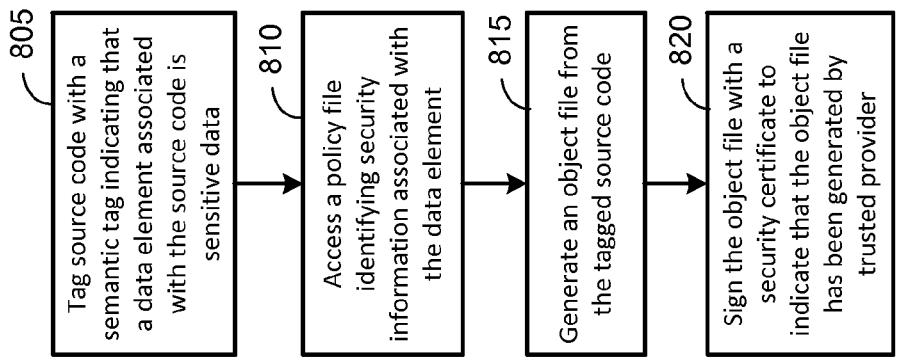
FIG. 8 is a flow diagram of an example process for building an application that implements the Secure Asset Manager according to the techniques discussed herein.

FIG. 8 is a flow diagram of an example process for building an application that implements the Secure Asset Manager according to the techniques discussed herein. The process illustrated in FIG. 8 can be implemented using the build system 125 illustrated in FIGS. 1-3, unless otherwise specified. The data tagging module 362 and/or the application build module 364 of the build system 125 can provide means for performing the various stages of the process illustrated in FIG. 8 unless otherwise specified.

Source code for an application can be tagged with a semantic tag indicating that a data element associated with the source code is sensitive data (stage 805). The data tagging module 362 of the build system 125 can be configured to provide a user interface that allows an application developer to tag sensitive data in the source code. The tags indicate that the dissemination of the information between applications should be limited to what is allowed in the policy file associated with the application. For example, the policy file can indicate whether the application being built can share the tagged information with another application. The policy file can also indicate whether the application being built can generate information derived from the tagged information. The data tagging module 362 can be configured to store the semantic tag information in the memory 260 of the build system via the data access module 366. The semantic tag information can be used by the SAM-aware compiler 615 generate secure objects that will be used to track data associated with the sensitive data element at run time.

Policy information identifying security information associated with the data element can be accessed (stage 810). The policy information associated with the data element can be accessed by the application build module 364 of the build system 125. The application build module 364 can be configured to request that the data access module 366 retrieve the policy information from the memory 260 or another memory of the build system 125. The build system 125 can include a policy configuration module 368 that can be configured to provide a user interface that allows the policy information for the application to be defined. The policy information can include information for one or more sensitive data elements associated with the application. The policy information can indicate how the application is allowed to make use of each sensitive data element. The policy information can indicate that the application is allowed to share the sensitive data element with certain other applications, modify the data element, and/or perform other actions with the sensitive data element.

An object file can be generated from the tagged source code (stage 815). The application build module 364 can be configured to generate object files from the source code 605 that includes the tag 610. The application build module 364 can be configured to implement the SAM-aware compiler 615 illustrated in FIG. 6. The application build module 364 can alternatively be configured to initialize the SAM-aware compiler 615 and to provide the source code 605 to the SAM-aware compiler 615. The SAM-aware compiler 615 can be configured to output object files that include the object code for the application and the policy information 620 associated with the application. The SAM-aware compiler 615 can be configured to generate object files associated with each of the data tags associated with sensitive data elements that were associated with the source code in stage 805. Objects associated with sensitive data element can be managed by the Secure Asset Manager 705 illustrated in FIG. 7 according to the policy information 620 associated with the application when the application is run by the target device 175.

The object file can be signed with a security certificate to indicate that the object file has been generated by a trusted provider (stage 820). The object files can optionally be encrypted and/or signed with a security certificate to indicate that the object files for the application have been generated by a trusted provider. The security certificate can be associated with a private key associated with the application developer or content provider responsible for distributing the application to the target device 175. The object files can be signed to indicate that they come from a trusted source that provides applications that comply with the techniques for handling sensitive information discussed herein. An attacker attempting to substitute a fake copy of an application purported to be SAM-compliant would lack the proper certificate for signing the object files. The object files can be processed for deployment 635. During the deployment phase, the object code included in the object files can be linked and/or otherwise processed for a particular target device 175 on which the application is to be deployed. The processing steps associated with deployment 635 of the application to the target device 175 can be performed by the application build module 364.

Figure 9:
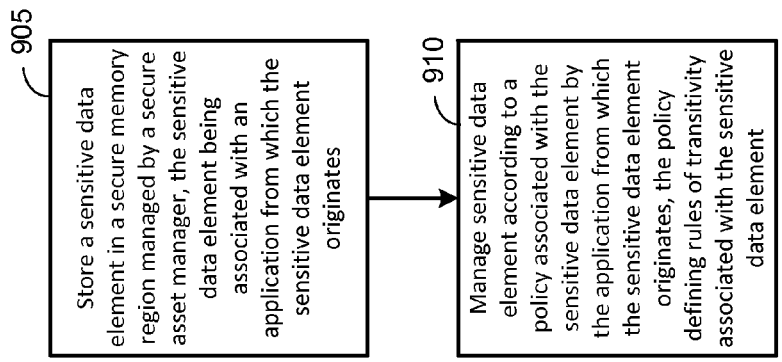
FIG. 9 is a flow diagram of an example process for protecting sensitive data according to the techniques disclosed herein.

FIG. 9 is a flow diagram of an example process for protecting sensitive data according to the techniques disclosed herein. The process illustrated in FIG. 9 can be implemented using the target device 175 illustrated in FIGS. 1, 4, and 5, unless otherwise specified. The secure asset manager module 562 of the target device 175 can provide means for performing the various stages of the process illustrated in FIG. 9 unless otherwise specified. The process illustrated in FIG. 9 demonstrates how the Secure Asset Manager 705 can manage access to sensitive data on the target device 175.

A sensitive data element can be stored in a secure memory region managed by a secure asset manager (stage 905). The SAM 705 can be configured to store an instance of a sensitive data element in the persistent working memory 720 of the memory region managed by the SAM 705. The sensitive data element can be stored in response to a first application SAM-compliant application that can have been built using the technique discussed above with respect to FIGS. 6 and 8. The SAM 705 can be configured to instantiate a new sensitive data element object in the persistent working memory 720 responsive to the request from the first application to deposit the sensitive data element in the SAM 705. The SAM 705 is configured to maintain the persistent working memory 720 in a portion of memory 460 of the target device 175 that is substantially inaccessible to other processes operating on the target device 175. The SAM 705 can be configured to maintain the persistent working memory 720 in a secure zone of memory provided by the processor 410, which may be part of the memory 460 or may be a separate memory of the target device 175. The SAM 705 can also be configured to maintain the persistent working memory 720 in a general purpose portion of memory 460, but SAM 705 can be configured to encrypt or otherwise obfuscate the data contents of the transient working memory 715 and the persistent working memory 720 associated with the Secure Asset Manager 705. The SAM 705 can also be configured to lock down data in the registers of the processor 410 of the target device 175 while data associated with a sensitive data element being managed by the SAM 705 is being operated on by the processor 410 to prevent unauthorized access to the data by non-SAM compliant processes.

The sensitive data element can be managed according a policy associated with the sensitive data element by an application from which the sensitive data element originates (stage 910). The policy information can define one or more transitive rules associated with the sensitive data element that define how the sensitive data element can be shared with and/or utilized by other applications. Managing the sensitive data element includes:

Adding audit entries to the audit logs stored in the persistent working memory 720 for any actions taken related to the sensitive data element.

Applying the policy of the application from which the sensitive data element originates to the sensitive data element and copies or data derived therefrom.

The SAM 705 provides one or more operations that can be performed on the sensitive data element within the secure memory region. Any intermediate values generated by the one or more functions are also stored in the secure memory region.

Data marked sensitive by the application from which the sensitive data element originates continues to be sensitive as are any date elements derived therefrom. The SAM 705 will continue to apply the same policy as was applied to the original data element by the application from which the data element originates, even if the data elements derived from this original data element are being used by a different application. Therefore, an application that is not authorized to access the sensitive data element according to the policy information will not be able to access the sensitive data element or the data derived therefrom, even if the sensitive data element has been operated upon by one or more intermediate applications that were authorized to access the sensitive data element.

Policies can be updated and the SAM 705 can be configured to apply the changes to the transitive rules included therein to instances of the sensitive data element associated with the rules that have been altered. The SAM 705 can be configured to receive updates to the policy information maintained by the target device 175. As discussed above, the policy information can be updated externally from the target device 175 by an application developer, content provider, network provider, or other source and propagated to the target device 175. The policy information can also be updated in some implementations by a user of the target device 175 via a user interface that allows the user of the target device 175 to configure the transitive rules associated with sensitive data elements. In some implementations, the SAM 705 can be configured to immediately apply the changes to the policy to any instances of the sensitive data element that are being managed by the SAM 705. The policy information can also be propagated down the chain of data elements associated with the sensitive data element, which may be copies of the sensitive data element or derived from the sensitive data element, or derived from another sensitive data element derived from the sensitive data element. The SAM 705 can also be configured to apply the policy changes to new instances of the sensitive data element and to continue to manage existing instances of the sensitive data element and/or sensitive data elements derived therefrom under the policy that was in place at the time that those instances of the sensitive data element were created, such that the instances of the sensitive data element are managed using the same policy throughout their lifecycle: creation through removal from memory as no longer being needed by a SAM-compliant application.

Policies can impose limits on how many levels away from the originating application a sensitive data element can be propagated. The term "level" used as used herein refers to how many instances along a chain of instances of a sensitive data element can be created before a limit imposed by the policy is reached. The policy can impose different types of limits on different types of operations that may be performed on a sensitive data element. For example, an example policy could implement rules such as: a copy of a sensitive data element may be propagated up to first number of levels from the original sensitive data element created by the originating application, derivative data elements may only be up to a second number of levels away from the original sensitive data element, modifications may only be made to the data element up to a third number of levels away from the original sensitive data element, and executable content may only be executed up to a fourth number of levels away from the original sensitive data element, where the first, second, third, and fourth level limitations may be the same value or a different value. Once each of these levels is reached, the SAM 705 can prevent the operation associated with these levels from being performed.

Figure 10:
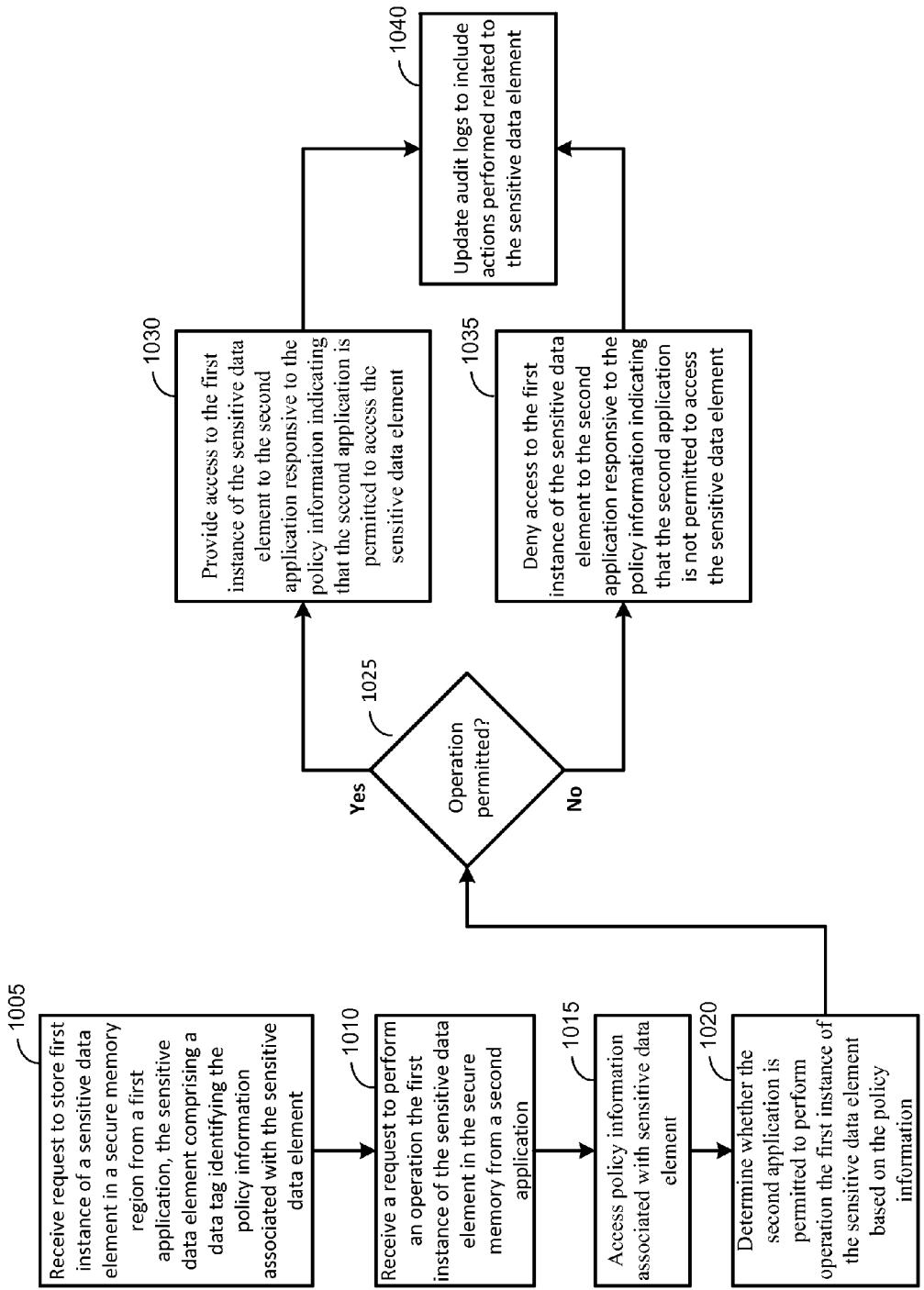
FIG. 10 is a flow diagram of an example process for controlling access to a sensitive data element according to the techniques discussed herein.

FIG. 10 is a flow diagram of an example process for operating an application that implements the Secure Asset Manager according to the techniques discussed herein. The process illustrated in FIG. 10 can be implemented using the target device 175 illustrated in FIGS. 1, 4, and 5, unless otherwise specified. The secure asset manager module 562 of the target device 175 can provide means for performing the various stages of the process illustrated in FIG. 10 unless otherwise specified. The process illustrated in FIG. 10 demonstrates how the Secure Asset Manager 705 can manage a sensitive data on the target device 175. The process illustrated in FIG. 9 provides an example of the interactions between applications that can occur on the target device 175 and the controlling of dissemination of sensitive data between applications. The SAM 705 can be implemented by the secure asset manager module 562 of the target device 175. The process illustrated in FIG. 10 can be used to implement, at least in part, stage 910 of the process illustrated in FIG. 9.

A request to deposit a first instance of a sensitive data element in a secure memory region can be received from a first application (stage 1005). The sensitive data element comprising data tag identifying the policy information associated with the sensitive data element. The sensitive data element is a data element utilized by the first application. The sensitive data element was associated with a tag 610 in the source code 605 of the application. The sensitive data element is an instance of information used by the application that the developer of the application tagged as information that should not be freely disseminated by the application. The dissemination of the sensitive information is to be controlled by the Secure Asset Manager 705 based on the policy information 620 associated with the application. The first application is a SAM-compliant application and can have been built using the technique discussed above with respect to FIGS. 6 and 8. The SAM 705 can be configured to instantiate a new sensitive data element object in the persistent working memory 720 responsive to the request from the first application to deposit the sensitive data element in the SAM 705. The SAM 705 is configured to maintain the persistent working memory 720 in a portion of memory 460 of the target device 175 that is substantially inaccessible to other processes operating on the target device 175. The SAM 705 can be configured to maintain the persistent working memory 720 in a secure zone of memory provided by the processor 410, which may be part of the memory 460 or may be a separate memory of the target device 175. The SAM 705 can also be configured to maintain the persistent working memory 720 in a general purpose portion of memory 460, but SAM 705 can be configured to encrypt or otherwise obfuscate the data contents of the transient working memory 715 and the persistent working memory 720 associated with the Secure Asset Manager 705.

The SAM 705 can be configured to associate an identifier associated with the application that initiated the request with the newly created sensitive data element object and/or store the policy information associated with that application in the sensitive data object. The SAM 705 can utilize the policy information stored in the object to determine whether the sensitive data stored therein can be shared with other applications, modified, and/or otherwise utilized by the application and/or other applications. The SAM 705 can be configured associate this policy information stored in the sensitive data element object with any sensitive data element objects derived from the original sensitive data element object, so that the policy information follows the sensitive date elements for the entire lifecycle of the sensitive data element. The SAM 705 applies the original policy rules to the sensitive data object and any derivative sensitive data objects to prevent the transitive issues related to applications storing data. For example, if the policy information associated with Application A allows Application A to share a particular sensitive data element with application B but not with Application C, the SAM 705 will prevent Application B from sharing this sensitive data element with Application C because the policy information from Application A follows the sensitive data element object through the entire lifecycle of the sensitive data element.

A request to perform an operation on the first instance of the sensitive data element in the secure memory from a second application can be received (stage 1010). The first application cannot directly share the first instance of the sensitive data element with the second application, because the SAM 705 maintains the instance of the sensitive data element in the persistent working memory 720. The first application can request the SAM 705 perform some action on the instance of the sensitive data element stored in the persistent working memory 720 including sharing access the first instance of the sensitive data with the second application. The first application can be configured to request that the SAM 705 provide the second application with access to the first instance of the sensitive data element responsive to a request from the second application or from some action taken on the part of the first application. The logger module 710 of the SAM 705 can be configured to add information associated with the request to the audit logs maintained by the SAM 705. The information added to the audit log can include information identifying what information was requested, which application made the request to access the information, which application was the source of the information, and/or other information that can be later used to track the dissemination of sensitive information. Various types of operations can be requested to be performed on the first instance of the sensitive data element, including reading or accessing the sensitive data element, modifying the sensitive data element, or execute the sensitive data element where the sensitive data element comprises an executable component. The executable component can comprise processor-executable program code. The SAM 705 can be configured to execute the executable component within the secure memory space maintained by the SAM 705.

The following example illustrates the concepts discussed with respect to FIG. 10, but is not intended to limit the types of applications with which the techniques discussed herein. For the purposes of this example, the first application, referred to herein Application A, is a banking application and the second application, referred to herein is Application B, is an investment application and both Application A and Application B have been developed to be SAM-compliant applications that utilize the SAM 705 for managing access to sensitive data. Application B may wish to obtain a bank account number associated with a user of Application A to enable the investment Application B to purchase stocks or other investments using funds from the bank account associated with the user. Accordingly, Application B can either request access to the sensitive data element for the bank account information from the SAM 705, or the Application B can request the access to the sensitive data element for the bank account information from Application A and Application A can forward the request to the SAM 705.

The policy information associated with each SAM-compliant application can be read by other SAM-compliant applications on the target device 175 and the other applications can know which information may be requested. A SAM-compliant application can also be configured to request access to a particular sensitive data element from another application on the target device 175. In some implementations, this request may be triggered in response to an instruction from a user of the target device 175. For example, a SAM-compliant application can be configured to request a sensitive data element from a user, such as bank account information, from the user of the target device 175. The SAM-compliant application can provide a user interface that allow the user to enter the requested information or to identify another SAM-compliant application on the target device 175 that has access to the requested information. The SAM-compliant application can then request the desired information from the other SAM-compliant application, and the SAM 705 may allow the SAM-compliant application to access the requested information based on the policy information associated with the sensitive data element and the application which is identified as having access to the sensitive data element.

Policy information associated with sensitive data element can be accessed (stage 1015). The SAM 705 can access the policy information for the first application. The sensitive data element was generated by the first application. Therefore, the policy information associated with the first application will be applied by the SAM 705 to the sensitive data element and any data elements derived from the sensitive data element. The policy information can be stored in the persistent working memory 720 maintained by the SAM 705. The SAM 705 can be configured to request the policy information 620 from the trusted entity 190 in the event that the policy information is not available in the persistent working memory 720. As discussed above, the policy information associated with a particular data element can be identified in the sensitive data object element maintained by the SAM 705. The SAM 705 can use the information obtained from the sensitive data element object to determine which policy information should be obtained.

A determination can be made whether the second application is permitted to perform an operation the first instance of the sensitive data element based on the policy information can be made (stage 1020). The SAM 705 can determine whether the second application can access the first instance of the sensitive data element in the persistent working memory 720 based on the policy information associated with the first application. The policy information can indicate with which applications the first application can share the sensitive data elements. The policy information can identify which sensitive data elements the first application can share with which other applications. An application may be associated with multiple sensitive data elements which were tagged in the source code, and the policy information can include information for each sensitive data element which indicates how that particular data element may be shared. Each sensitive data elements can potentially have different applications with which that sensitive data can be shared. As discussed above, if the requested sensitive date element was obtained from another application or derived from another sensitive data element, the policy information associated with the source sensitive data element will be applied to the requested sensitive data element and the requested sensitive data element cannot be used or disseminated contrary to the policy associated with the source sensitive data element.

A determination whether the operation on to the sensitive data element is permitted by the policy information (stage 1025). The SAM 705 can be configured to compare the policy information associated with the sensitive data element with the access requested by the second application. The request can indicate what type of access the second application desires and determine whether the policy information associated with the sensitive data element permits such access to the second data element. For example, the request may indicate that the second application is requesting read-only access, access to modify the sensitive data element, to make a copy of the sensitive data element, and/or to perform calculations on or derive new data from the sensitive data element. These examples are provided to illustrate some of the possible types of access that may be requested by the second application and are not meant to be exhaustive. Other types of access in addition to or instead of the examples requested may be received from the second application, and the SAM 705 can make a determination whether such access is permitted. The SAM 705 can proceed to stage 930 responsive to the policy indicating that the second application is permitted to access the first instance of the sensitive data element or to stage 935 responsive to the policy indicating that the second application is not permitted to access the first instance of the sensitive data element.

Access to the first instance of the sensitive data element to the second application can be provided responsive to the policy information indicating that the second application is permitted to access the sensitive data element (stage 1030). The SAM 705 can be configured to perform different types of actions responsive to determining that the policy information indicates that the second application is permitted to access the sensitive data element. For example, the SAM 705 can be configured to create a second instance of the second data element for the second application, which may be read-only if the second application requested and was granted read-only access to the sensitive data element or which may be modifiable if the second application requested and was granted modify access to the sensitive data element. The SAM 705 can be configured to associate the policy information for the first application with the second instances of the second data element. The SAM 705 can be configured to generate as the second instance of the sensitive data element a new instance of the particular type of data object appropriate for the data being stored. The SAM 705 can be configured to obtain this information from the first instance of the sensitive data element. The SAM 705 can also be configured to store a reference to the policy information associated with the first application in the second instance of the data element. The SAM 705 can use this reference to the policy information associated with the first application to determine which actions the second application may perform on the data stored in the second instance of the sensitive data element and/or any other applications which may access the second instance of the sensitive data element. The logger module 710 of the SAM 705 can be configured add information to the audit logs maintained by the SAM 705 indicating that second application was granted access to the sensitive data element and that a new instance of the data element was instantiated in the persistent working memory 720 by the SAM 705.

Access to the first instance of the sensitive data element can be denied to the second application responsive to the policy information indicating that the second application is not permitted to access the sensitive data element (stage 1035). The logger module 710 of the SAM 705 can be configured add information to the audit logs maintained by the SAM 705 indicating that second application was denied access to the sensitive data element based on the policy information associated with the first application that was associated with the first instance of the sensitive data element.

Figure 11:
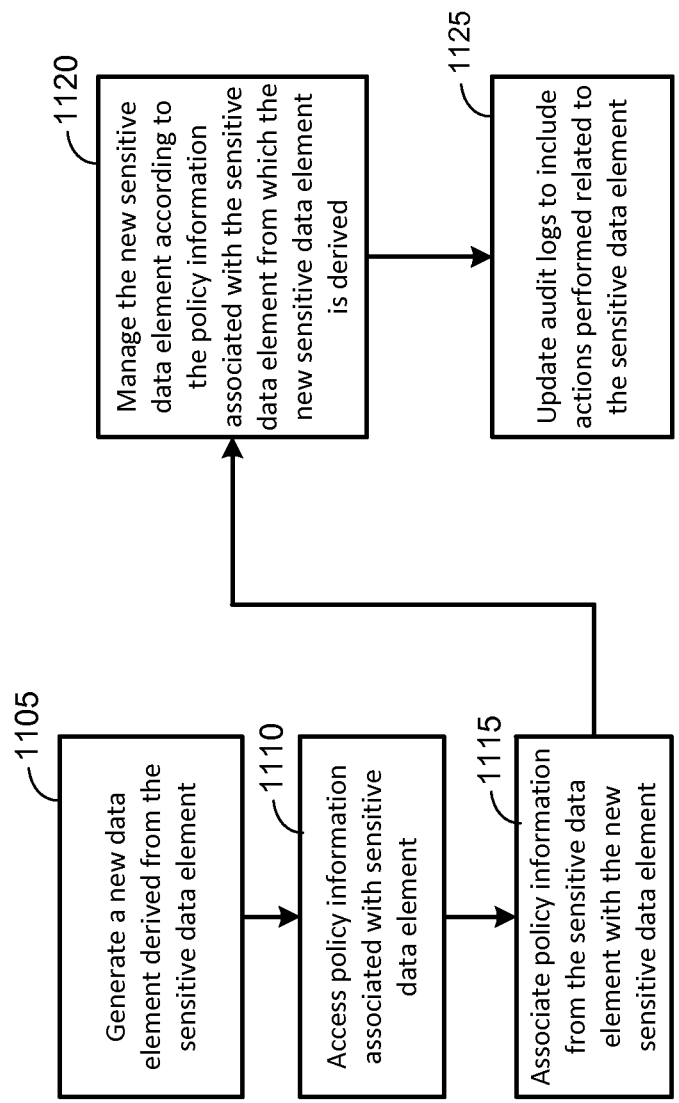
FIG. 11 is a flow diagram of an example process for deriving a new sensitive data element from an existing sensitive data element according to the techniques discussed herein.

FIG. 11 is a flow diagram of an example process for operating an application that implements the Secure Asset Manager according to the techniques discussed herein. The process illustrated in FIG. 11 can be implemented using the target device 175 illustrated in FIGS. 1, 4, and 5, unless otherwise specified. The secure asset manager module 562 of the target device 175 can provide means for performing the various stages of the process illustrated in FIG. 11 unless otherwise specified. The process illustrated in FIG. 11 demonstrates how the Secure Asset Manager 705 can manage a sensitive data on the target device 175. The process illustrated in FIG. 11 provides an example of generating a new data element from an existing sensitive data element. The SAM 705 can be implemented by the secure asset manager module 562 of the target device 175. The process illustrated in FIG. 11 can be used to implement, at least in part, stage 910 of the process illustrated in FIG. 9.

A chain of data elements can be derived from the sensitive data element can be generated (stage 1105). The SAM 705 can be configured to maintain a mapping of each of the data elements that are derived from the original sensitive data element. The SAM 705 can be configured to store the mapping information in the persistent working memory 720 maintained by the SAM 705. A particular instance of a sensitive data element may have more than one chain of data elements derived therefrom. The SAM 705 can use this mapping information to determine whether a particular operation can be performed while complying with any limits on the operation imposed by the policy information associated with the sensitive data element. The SAM 705 can also use this mapping to apply policy changes associated with the policy associated with a particular sensitive data element to the chain or chains of instances sensitive data elements derived from the sensitive data element.

Policy information associated with sensitive data element can be accessed (stage 1110). The SAM 705 can access the policy information for the sensitive data element that was associated with the sensitive data element by the application of origin of the sensitive data element. The SAM 705 will apply this policy information to the sensitive data element and any data elements derived from the sensitive data element, even if the instance of the sensitive data element or the data elements derived therefrom are being used by another application. The policy information can be stored in the persistent working memory 720 maintained by the SAM 705. The SAM 705 can be configured to request the policy information 620 from the trusted entity 190 in the event that the policy information is not available in the persistent working memory 720. As discussed above, the policy information associated with a particular data element can be identified in the sensitive data object element maintained by the SAM 705. The SAM 705 can use the information obtained from the sensitive data element object to determine which policy information should be obtained.

The policy information from the sensitive data element can be associated with the each new sensitive data element of the chain of sensitive data elements (stage 1115). The SAM 705 applies the policy information from the sensitive data element to each sensitive data element of the chain of data elements. The SAM 705 can maintain a map of each of the sensitive data elements that are included in the chain of data elements associated with the original sensitive data element. The SAM 705 can maintain this mapping in the persistent working memory 720 and can use this mapping to ensure that any limits of the operations performed associated with the transitive rules of the policy can be enforced and to enable the SAM 705 to propagate changes to the policy information through to each instance of the sensitive data element if necessary.

The new sensitive data elements can be managed according to the policy information associated with the sensitive data element from which the new sensitive data element is derived (stage 1120). The SAM 705 can be configured to manage each of the chain of data elements derived from the sensitive data elements according to the policy information associated with the original sensitive data element. The SAM 705 can manage each of the sensitive data elements according to the process illustrated in FIG. 9.

FIG. 9 is a flow diagram of an example process for protecting sensitive data according to the techniques disclosed herein. The process illustrated in FIG. 9 can be implemented using the target device 175 illustrated in FIGS. 1, 4, and 5, unless otherwise specified. The secure asset manager module 562 of the target device 175 can provide means for performing the various stages of the process illustrated in FIG. 9 unless otherwise specified. The process illustrated in FIG. 9 demonstrates how the Secure Asset Manager 705 can manage access to sensitive data on the target device 175.

The audit logs can be updated to include actions performed related to the sensitive data elements (stage 1125). The logger module 710 of the SAM 705 updates the audit logs to include any actions that are performed on the sensitive data element or any of the chain of data elements that are derived from the sensitive data element. The audit log information can be stored in the persistent working memory 720 maintained by the SAM 705 to prevent unauthorized access or modifications to the audit logs. The logger module 710 can be configured to compress the audit logs if the size of the audit logs exceeds a predetermined threshold and/or can be configured to offload all or a portion of the audit logs to an external server, such as the trusted entity 190 to free up memory on the target device 175. The logger module 720 can be configured to encrypt the contents of the audit logs before offloading the audit logs from the target device 175. The logger module 720 can also be configured to delete entries in the audit logs that are older than a predetermined period of time in order to make room for new entries. The logger module 720 can also be configured to offload and/or delete entries from the audit logs if the size of the logs exceeds a predetermined threshold in order to prevent the audit logs from consuming too much memory on the target device 175.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

Additional implementation of the techniques disclosed herein include:

1A. An apparatus for protecting sensitive data, the apparatus comprising:
    means for storing a sensitive data element in a secure memory region managed by a secure asset manager; and
    means for managing the sensitive data element according to a policy associated with the sensitive data element by an application from which the sensitive data element originates, the policy defining transitive rules associated with the sensitive data element.

2A. The apparatus of 1A, wherein the transitive rules comprise rules defining with which other applications the sensitive data element can be shared.

3A. The apparatus of 1A, wherein the means for managing the sensitive data element further comprises means for applying the policy from the application from which the sensitive data element originates to data elements derived from the sensitive data element.

4A. The apparatus of 1A, wherein the means for managing the sensitive data element further comprises means auditing each action performed on the sensitive data element and any data elements derived therefrom.

5A. The apparatus of 4A, wherein the means for auditing each action performed on the sensitive data element and any data elements derived therefrom comprises means for storing audit information in the secure memory region managed by the secure asset manager.

6A. The apparatus of 1A, wherein the means for managing the sensitive data element further comprises means for providing one or more functions for performing operations on the sensitive data element.

7A. The apparatus of 1A, wherein the means for managing the sensitive data element further comprises means for storing intermediate data values generated by the one or more functions in the secure memory region.

8A. A non-transitory, computer-readable medium, having stored thereon computer-readable instructions for protecting sensitive data, comprising instructions configured to cause a computer to:
    store a sensitive data element in a secure memory region managed by a secure asset manager; and
    manage the sensitive data element according to a policy associated with the sensitive data element by an application from which the sensitive data element originates, the policy defining transitive rules associated with the sensitive data element.

9A. The non-transitory, computer-readable medium of 8A, wherein the transitive rules comprise rules defining with which other applications the sensitive data element can be shared.

10A. The non-transitory, computer-readable medium of 8A, wherein the instructions configured to cause the computer to manage the sensitive data element further comprise instructions configured to cause the computer to apply the policy from the application from which the sensitive data element originates to data elements derived from the sensitive data element.

11A. The non-transitory, computer-readable medium of 8A, wherein the instructions configured to cause the computer to manage the sensitive data element further comprise instructions configured to cause the computer to audit each action performed on the sensitive data element and any data elements derived therefrom.

12A. The non-transitory, computer-readable medium of 11A, wherein the instructions configured to cause the computer to audit each action performed on the sensitive data element and any data elements derived therefrom comprise instructions configured to cause the computer to store audit information in the secure memory region managed by the secure asset manager.

13A. The non-transitory, computer-readable medium of 8A, wherein the instructions configured to cause the computer to manage the sensitive data element further comprise instructions configured to cause the computer to provide one or more functions for performing operations on the sensitive data element.

14A. The non-transitory, computer-readable medium of 8A, wherein the instructions configured to cause the computer to manage the sensitive data element further comprise instructions configured to cause the computer to store intermediate data values generated by the one or more functions in the secure memory region.

15B. An apparatus for generating a secure asset manager compliant application, the apparatus comprising:
 means for tagging source code for the application with a data tag to indicate that a data element associated with the source code is a sensitive data element;
 means for accessing a policy file comprising transitive rules associated with the sensitive data element; and
 means for generating one or more object files for the application from the source code.

16B. The apparatus of 15B, further comprising means for signing the one or more object files with a security certificate indicating that the object file has been generated by a trusted provider.

17B. The apparatus of 15B, wherein the data tag comprises a unique identifier that identifies which policy must be applied by a secure asset manager to the sensitive data element associated with the data tag at runtime of the application.

18B. The apparatus of 15B, wherein the means for generating the one or more object files for the application comprises means for compiling the source code with a secure asset manager compliant compiler that is configured to recognize the data tag and to generate a sensitive data object type for managing instances of the sensitive data element.

19B. The apparatus of 15B, further comprising linking the object file with at least one other object file or library to create an executable file for a target device that implements a secure asset manager.

20B. The apparatus of 15B, wherein the transitive rules associated with the sensitive data element identify a set of trusted applications that are allowed to access and perform one or more operations on the sensitive data element.

21B. The apparatus of 15B, wherein the transitive rules associated with the sensitive data element identify which applications may derive data from the sensitive data element.

22B. A non-transitory, computer-readable medium, having stored thereon computer-readable instructions for generating a secure asset manager compliant application, comprising instructions configured to cause a computer to:
 tag source code for the application with a data tag to indicate that a data element associated with the source code is a sensitive data element;
 access a policy file comprising transitive rules associated with the sensitive data element; and
 generate one or more object files for the application from the source code.

23B. The non-transitory, computer-readable medium of 22B, further comprising code to cause the computer to sign the one or more object files with a security certificate indicating that the object file has been generated by a trusted provider.

24B. The non-transitory, computer-readable medium of 22B, wherein the data tag comprises a unique identifier that identifies which policy must be applied by a secure asset manager to the sensitive data element associated with the data tag at runtime of the application.

25B. The non-transitory, computer-readable medium of 22B, wherein the instructions to cause the computer to generate the one or more object files for the application comprise instructions to cause the computer to compile the source code with a secure asset manager compliant compiler that is configured to recognize the data tag and to generate a sensitive data object type for managing instances of the sensitive data element.

26B. The non-transitory, computer-readable medium of claim 22B, further comprising instructions to cause the computer to link the object file with at least one other object file or library to create an executable file for a target device that implements a secure asset manager.

27B. The non-transitory, computer-readable medium of 22B, wherein the transitive rules associated with the sensitive data element identify a set of trusted applications that are allowed to access and perform one or more operations on the sensitive data element.

28B. The non-transitory, computer-readable medium of 27B, wherein the transitive rules associated with the sensitive data element identify which applications may derive data from the sensitive data element.

The generic principles discussed herein may be applied to other implementations without departing from the spirit or scope of the disclosure or claims.

What is claimed is:

1. A method for protecting sensitive data on a computing device, the method comprising:
 storing a sensitive data element in a secure memory region managed by a secure asset manager of the computing device, wherein data stored in the secure memory region is substantially inaccessible to other processes operating on the computing device; and
 managing the sensitive data element using the secure asset manager according to a policy associated with the sensitive data element by an application from which the sensitive data element originates, the policy defining transitive rules associated with the sensitive data element, the transitive rules comprising rules defining with which other applications the sensitive data element can be shared and whether the other applications can share the sensitive information, wherein managing the sensitive data element comprises permitting access to the sensitive data element stored in the secure memory region based on the transitive rules.

2. The method of claim 1, wherein managing the sensitive data element further comprises applying the policy from the application from which the sensitive data element originates to data elements derived from the sensitive data element.

3. The method of claim 2, further comprising:
revoking access to the sensitive data element;
identifying data elements derived from the sensitive data element; and
revoking access to the data elements derived from the sensitive data element.

4. The method of claim 1, wherein managing the sensitive data element further comprises auditing each action performed on the sensitive data element and any data elements derived therefrom.

5. The method of claim 4, wherein auditing each action performed on the sensitive data element and any data elements derived therefrom comprises storing audit information in the secure memory region managed by the secure asset manager.

6. The method of claim 1, wherein managing the sensitive data element further comprises providing one or more functions for performing operations on the sensitive data element.

7. The method of claim 6, wherein managing the sensitive data element further comprises storing intermediate data values generated by the one or more functions in the secure memory region.

8. An apparatus for protecting sensitive data comprising:
a memory; and
a processor communicatively coupled to the memory, the processor configured to:
store a sensitive data element in a secure memory region of the memory managed by a secure asset manager of the apparatus, wherein data stored in the secure memory region is substantially inaccessible to other processes operating on the apparatus; and
manage the sensitive data element according to a policy associated with the sensitive data element by an application from which the sensitive data element originates, the policy defining transitive rules associated with the sensitive data element, the transitive rules comprising rules defining with which other applications the sensitive data element can be shared and whether the other applications can share the sensitive information, wherein the secure asset manager is configured to permit access to the sensitive data element stored in the secure memory region based on the transitive rules.

9. The apparatus of claim 8, wherein the processor configured to manage the sensitive data element is further configured to apply the policy from the application from which the sensitive data element originates to data elements derived from the sensitive data element.

10. The apparatus of claim 8, wherein the processor configured to manage the sensitive data element is further configured to audit each action performed on the sensitive data element and any data elements derived therefrom.

11. The apparatus of claim 10, wherein the processor configured to audit each action performed on the sensitive data element and any data elements derived therefrom is further configured to store audit information in the secure memory region managed by the secure asset manager.

12. The apparatus of claim 8, wherein the processor configured to manage the sensitive data element is further configured to provide one or more functions for performing operations on the sensitive data element.

13. The apparatus of claim 12, wherein the processor configured to manage the sensitive data element is further configured to store intermediate data values generated by the one or more functions in the secure memory region.

14. An apparatus for protecting sensitive data, the apparatus comprising:
means for storing a sensitive data element in a secure memory region managed by a secure asset manager of the apparatus, wherein data stored in a secure memory region is substantially inaccessible to other processes operating on the apparatus; and
means for managing the sensitive data element according to a policy associated with the sensitive data element by an application from which the sensitive data element originates, the policy defining transitive rules associated with the sensitive data element, the transitive rules comprising rules defining with which other applications the sensitive data element can be shared and whether the other applications can share the sensitive information, wherein the secure asset manager is configured to permit access to the sensitive data element stored in the secure memory region based on the transitive rules.

15. The apparatus of claim 14, wherein the means for managing the sensitive data element further comprises means for applying the policy from the application from which the sensitive data element originates to data elements derived from the sensitive data element.

16. The apparatus of claim 14, wherein the means for managing the sensitive data element further comprises means auditing each action performed on the sensitive data element and any data elements derived therefrom.

17. The apparatus of claim 16, wherein the means for auditing each action performed on the sensitive data element and any data elements derived therefrom comprises means for storing audit information in the secure memory region managed by the secure asset manager.

18. The apparatus of claim 14, wherein the means for managing the sensitive data element further comprises means for providing one or more functions for performing operations on the sensitive data element.

19. The apparatus of claim 18, wherein the means for managing the sensitive data element further comprises means for storing intermediate data values generated by the one or more functions in the secure memory region.

20. A non-transitory, computer-readable medium, having stored thereon computer-readable instructions for protecting sensitive data on a computing device, comprising instructions configured to cause the computing device to:
store a sensitive data element in a secure memory region managed by a secure asset manager of the computing device, wherein data stored in the secure memory region is substantially inaccessible to other processes operating on the computing device; and
manage the sensitive data element according to a policy associated with the sensitive data element by an application from which the sensitive data element originates, the policy defining transitive rules associated with the sensitive data element, the transitive rules comprising rules defining with which other applications the sensitive data element can be shared and whether the other applications can share the sensitive information, wherein managing the sensitive data element comprises permitting access to the sensitive data element stored in the secure memory region based on the transitive rules.

21. The non-transitory, computer-readable medium of claim 20, wherein the instructions configured to cause the computer to manage the sensitive data element further comprise instructions configured to cause the computer to apply the policy from the application from which the sensitive data element originates to data elements derived from the sensitive data element.

22. The non-transitory, computer-readable medium of claim 21, wherein the instructions configured to cause the computer to manage the sensitive data element further comprise instructions configured to cause the computer to audit each action performed on the sensitive data element and any data elements derived therefrom.

23. The non-transitory, computer-readable medium of claim 22, wherein the instructions configured to cause the computer to audit each action performed on the sensitive data element and any data elements derived therefrom comprise instructions configured to cause the computer to store audit information in the secure memory region managed by the secure asset manager.

24. The non-transitory, computer-readable medium of claim 21, wherein the instructions configured to cause the computer to manage the sensitive data element further comprise instructions configured to cause the computer to provide one or more functions for performing operations on the sensitive data element.

25. The non-transitory, computer-readable medium of claim 24, wherein the instructions configured to cause the computer to manage the sensitive data element further comprise instructions configured to cause the computer to store intermediate data values generated by the one or more functions in the secure memory region.

* * * * *